US012726754B2

(12) United States Patent
Sterns et al.

(10) Patent No.: US 12,726,754 B2
(45) Date of Patent: Sep. 1, 2026

(54) WEARABLE SMART ELECTRONICS

(71) Applicant: Blyngz Luxury Technologies, Inc., Saint Paul, MN (US)

(72) Inventors: Kathleen S. Sterns, Saint Paul, MN (US); Rama Prasad, Hamel, MN (US); Marlyn Anderson, St. Louis Park, MN (US)

(73) Assignee: Blyngz Luxury Technologies, Inc., Saint Paul, MN (US)

( * ) Notice: Subject to any disclaimer, the term of this patent is extended or adjusted under 35 U.S.C. 154(b) by 132 days.

(21) Appl. No.: 18/449,863

(22) Filed: Aug. 15, 2023

(65) Prior Publication Data

US 2024/0251194 A1 Jul. 25, 2024

Related U.S. Application Data

(60) Provisional application No. 63/481,196, filed on Jan. 24, 2023.

(51) Int. Cl.
*H04R 1/10* (2026.01)

(52) U.S. Cl.
CPC ........... *H04R 1/105* (2013.01); *H04R 1/1008* (2013.01); *H04R 1/1066* (2013.01)

(58) Field of Classification Search
CPC .... H04R 1/105; H04R 1/1008; H04R 1/1066; H04R 1/1058; H04R 25/02; H04R 25/65;
(Continued)

(56) References Cited

U.S. PATENT DOCUMENTS 4,827,525 A * 5/1989 Hotvet ................. H04R 25/604 381/60
7,206,429 B1 * 4/2007 Vossler ................ H04R 1/1033 381/381
(Continued)

FOREIGN PATENT DOCUMENTS

CN 1726740 A * 1/2006 ........... H04R 1/1066
CN 113329292 A * 8/2021 ......... H05K 7/20127
(Continued)

OTHER PUBLICATIONS

Designboom, Artistic, Reclaimed Metal Earbuds by Planet Beyond Encourage Aesthetic Self Expression, https://www.designboom.com/design/artistic-reclaimed-metal-earbuds-planet-beyond-12-28-2019/, accessed Oct. 16, 2023.
(Continued)

*Primary Examiner* — Angelica M Mckinney
(74) *Attorney, Agent, or Firm* — Bryan Kravis; Grumbles Law PLLC

(57) ABSTRACT

A wearable electronics device with at least one replaceable ornamentation that can be structured and configured to attach to a user's ear in at least two locations and provide a user with the ability to have a changeable aesthetic. The connections to a user's ear can vary from posts to clips and may also include a hanger that can be an additional connection to a user's ear by providing purchase on the user's ear from the antitragus to the tragus, thereby improving the weight distribution of the device as compared to existing wearable electronics. Such wearable electronics may include audio components and biometric sensors to provide monitoring of a user's health.

55 Claims, 7 Drawing Sheets

(58) Field of Classification Search
CPC ...... H04R 1/10; H04R 1/1025; H04R 1/1033; H04R 25/604; H04W 76/10; H04M 1/6066; H04M 1/05; H04M 1/0283; A44C 7/00; A44C 7/004; H05K 7/20127
See application file for complete search history.

(56) References Cited

U.S. PATENT DOCUMENTS

| | | | | |
|---|---|---|---|---|
| 7,536,150 | B2 * | 5/2009 | Ryann | H04M 1/05 379/330 |
| 10,735,842 | B2 | 8/2020 | Prasad et al. | |
| 10,939,194 | B2 * | 3/2021 | Moudgill | H04W 76/10 |
| 12,470,859 | B1 * | 11/2025 | Wheeler | H04R 1/1075 |
| 2004/0008855 | A1 * | 1/2004 | Ham | H04R 1/105 381/381 |
| 2004/0101151 | A1 * | 5/2004 | Webber | H04R 1/1058 381/328 |
| 2007/0058831 | A1 * | 3/2007 | Rie | H04R 1/105 381/374 |
| 2008/0311966 | A1 * | 12/2008 | Klein | H04R 1/1025 455/575.2 |
| 2014/0098983 | A1 * | 4/2014 | Clow | H04R 1/10 381/381 |
| 2014/0323183 | A1 * | 10/2014 | Klein | H04M 1/6066 455/569.1 |
| 2015/0110319 | A1 * | 4/2015 | Mimbs | H04R 25/02 381/322 |

FOREIGN PATENT DOCUMENTS

| | | | | | |
|---|---|---|---|---|---|
| CN | 220307343 | U | * | 1/2024 | H04R 1/10 |
| JP | 2004229179 | A | * | 8/2004 | H04R 25/02 |
| KR | 20070032572 | A | * | 3/2007 | H01R 13/58 |

OTHER PUBLICATIONS

Kickstarter for Nova H1 Audio Earrings—Earphones embedded in Earrings, https://www.kickstarter.com/projects/nova-audioearrings/audio-earrings-earphones-made-earrings/description, accessed Oct. 16, 2023.

Poshmark, Bloomingdale's, AirPods Anti-Lost Silver Gold Earrings Earbuds StudHolder Wireless Earphone Pro, https://poshmark.com/listing/AirPods-AntiLost-Silver-Gold-Earrings-Earbuds-Stud-Holder-Wireless-Earphone-Pro-62962fd460fded2b7ce2af6e?srsltid=AfmBOoq_%E2%80%A6, accessed Oct. 16, 2023.

* cited by examiner

WEARABLE SMART ELECTRONICS

FIELD OF THE INVENTION

This disclosure relates to electronic devices, particularly wearable electronics, that can send and receive data and are capable of being adjustable and modular.

BACKGROUND OF THE INVENTION

Out-of-ear hearable devices are an emerging category of wearable smart devices. Earbuds placed below the cheekbones adjacent to the ear have gained adoption for uses in scenarios where being able to hear around you improves personal safety and situational awareness. Audio sunglasses are getting good adoption in the marketplace because they are a familiar form factor. Another familiar form factor can be wireless hands-free audio devices that provide functionality for music, podcasts, and telephony. Out-of-ear form factors may be able to prevent uncomfortable feelings, poor fitting, hearing damage, and other safety concerns that can result from wearing earbuds inside an ear canal or pressing on the concha cartilage around it. "Smart" earrings have entered the marketplace in the past few years; for example, Pearl earrings by Nova Audio, and Teqnizan's Audio Earring.

The problem with audio earrings anchored to the earlobe piercing via a post, or as a clip-on, is that the speaker is located too far from the ear canal and not pointed directly towards the ear canal. Sound from such earrings is often not loud enough to be adequately audible. Additionally, there is sound leakage, meaning that others near the user can hear the sounds emitted from the device, thereby impairing the privacy of the user, and possibly disturbing others around them.

Further issues can arise from a smart earring's weight, which can make it uncomfortable to wear because the earring's weight rests on the soft tissue of an earlobe. For many users, traditional earrings weighing more than 7 grams each can be painful or uncomfortable when hanging from a post or a hook in an earlobe piercing. Additionally, early users reported a sense that the earring might tip or fall out or swivel out of position.

Moreover, there is a high degree of variability in the human outer ear's size, shape, and structure. The earlobe area itself varies significantly. An individual's earlobes can be small, large, long, nearly absent, fleshy, thin, attached, or unattached. In addition, a piercing location on an earlobe is highly variable and can move over the life of the individual as a result of wearing heavy ornamentations, loss of skin elasticity, or growth over the life of the individual (a 40-year old's ear may have grown 20% larger from the time when they were an 18-year old.)

The morphology of the ear, right above the earlobe and outside of the ear canal, has an antitragus (bump) and an intertragical notch or incisura. The size and shape of the antitragus and the intertragical notch are highly variable. The variability of the human ear, and the criticality of the location of the sound producing speaker, make this a technical problem requiring invention to specifically solve the audibility and sound leakage issue for the majority of the human population.

Additionally, there may be a desire for changeable aesthetic or fashionable expression via ear ornamentation.

Some may desire to change such aesthetic presentations daily, or even multiple times a day.

SUMMARY

This disclosure relates to adjustable wearable devices for securing to an ear, where in some embodiments the device may include an adjustable device that may have a first attachment module that can be structured and configured to engage with an earlobe; a second attachment module that may include a hanger, wherein the hanger can be structured and configured to mount an external portion of an ear above an earlobe. In such embodiments, the first attachment module may also further comprises a post or a first clip, wherein the post or the first clip may be structured and configured to attach to the earlobe.

Also, in such embodiments, there may be at least one ornamentation that can be disposed on the first attachment module. Additionally, in such embodiments the first attachment module may further comprises an extension, wherein the extension can comprise an auxiliary attachment for at least one ornamentation; or in such embodiments there can be at least one length adjustment mechanism, wherein the length adjustment mechanism may be configured to adjust the distance between the first attachment module and the second attachment module.

Other embodiments may include the hanger that may further have a stem disposed between a head and the second attachment module, wherein the hanger can be structured and configured to attach to a portion of the ear from an antitragus to a tragus of the ear. In such embodiments, there may also be a stem that can include a second clip. Any of the above embodiments may also include an electronics module.

Such embodiments, that include an electronics module that can be made from an assembly selected from a group consisting of wireless antenna, user interface (UI)/user experience (UX) (UI/UX interface), microphone, speaker, circuitry, battery, charging conduit, biosensor, haptic sensor, environmental sensors, transducer, computing processor chip, storage chip, and combinations thereof. Additionally, the embodiments can include a hanger that may also have a speaker and that speaker may also be configured to communicate with the electronics module.

In another embodiment, there may be an adjustable device for securing to an ear that can have a first attachment module that may be structured and configured to engage with an earlobe via a post or a first clip; a second attachment module that can have a hanger, wherein the hanger can be structured and configured to mount an external portion of an ear above the earlobe, and further wherein the hanger can include a head and a stem; an electronics module; at least one length adjustment mechanism, wherein the length adjustment mechanism can be configured to adjust the distance between the first attachment module and the second attachment module; a first ornamentation-attachment site that may be disposed on the electronics module; and a second ornamentation-attachment site that may be disposed on the first attachment module.

In such embodiments, there may also be an electronics module which can have an assembly selected from a group that can consists of wireless antenna, UI/UX interface, microphone, speaker, circuitry, battery, charging conduits, biosensors, haptic sensors, environmental sensors, transducers, computing processor chips, data storage chips, and combinations thereof.

Other embodiments may include a head that may have an electronic component disposed therein, and wherein the electronic component may be in communication with the electronics module. Or they may be an embodiment that can include a first length adjustment mechanism that can be a spring-loaded clip and may be disposed on the hanger. Additional embodiments may include a stem that may have a second clip.

A method of attaching an embodiment of an adjustable device to an ear may include the steps providing an adjustable device that can have a first attachment module that may be structured and configured to engage with an earlobe via a post or a first clip; a second attachment module that may have a hanger, wherein the hanger may be structured and configured to mount an external portion of an ear above the earlobe, and further wherein the hanger can include a head and a stem; an electronics module; at least one length adjustment mechanism, wherein the length adjustment mechanism can be configured to adjust a distance between the first attachment module and the second attachment module; a first ornamentation-attachment site that may be disposed on the electronics module; and a second ornamentation-attachment site that may be disposed on the first attachment module.

The next step may be a determining of a distance from a connection point on the earlobe to the external portion of the ear above the earlobe. That may be followed by a step where using the at least one length adjustment mechanism may be adjusted to the distance between the first attachment module and the second attachment module from the distance determined from the connection point on the earlobe to the external portion of the ear above the earlobe. Once adjusted, the next steps may be to attach the first attachment module to the earlobe; and then hanging the hanger onto the external portion of the ear above the earlobe.

In such a method, there may also be an electronics module that can be made from an assembly selected from a group consisting of wireless antenna, UI/UX interface, microphone, speaker, circuitry, battery, charging conduits, biosensors, haptic sensors, environmental sensors, transducers, computing processor chips, storage chips, and combinations thereof.

Other such embodiments of the method may include a head that may include a speaker disposed therein, and wherein the speaker may be in communication with the electronics module. Additionally, such embodiments of the method may include a first length adjustment mechanism that may be a spring-loaded rail and may be disposed on the hanger; or where the stem may include a second clip.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

Figure 1:
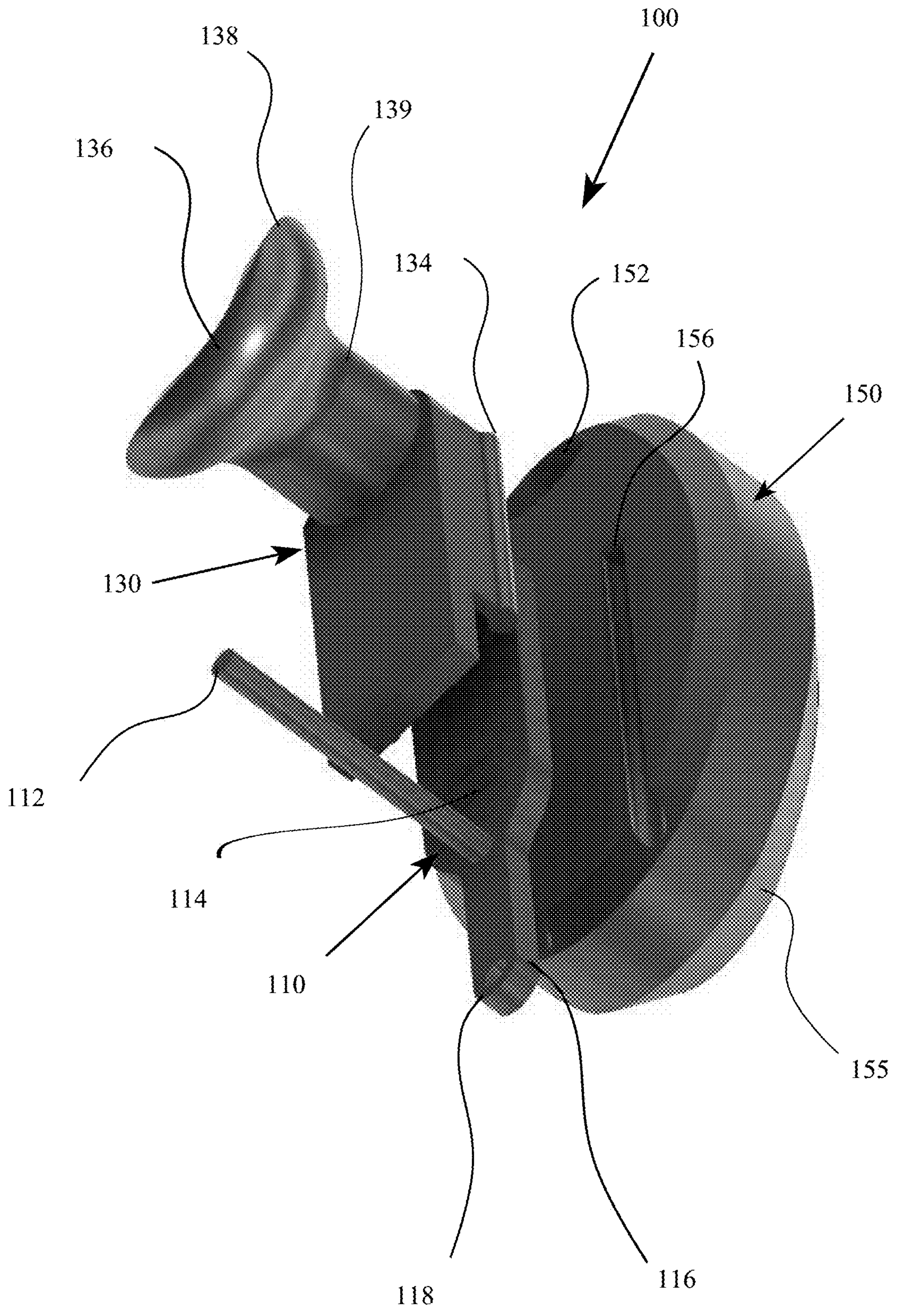
FIG. 1 is a bottom perspective view of an embodiment of an adjustable device for securing to an ear.

The present disclosure relates to wearable electronics, and, more particularly, relates to wearable electronics with at least one replaceable ornamentation that can be structured and configured to attach to a user's ear in at least two locations. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements; those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Out-of-ear hearable devices are an emerging category. Earbuds placed below the cheekbones adjacent to the ear have gained adoption for use scenarios where being able to hear around you improves personal safety and situational awareness. Such audio devices are getting good adoption in the marketplace because of the wireless hands-free audio functionality for music, podcasts, and telephony. Out-of-ear form factors may prevent the uncomfortable feeling, poor fit, hearing damage, and safety concerns that can result from wearing earbuds inside the ear canals or pressing on the concha cartilage around it, primarily because there is only one attachment point in the existing devices.

Users may have a desire for a changeable aesthetic or fashion expression via ear jewelry and ornamentation. An important factor that can be a user's desire to have jewelry or embellishments that are customizable for personal expression. The desire to change earrings daily, or multiple times during the day, conforms to existing earring wearing behavior for millennia.

The embodiments can be presented herein can describe location and anchoring methods of the earring Base Frame or plate (attachment modules), and the audio/electronics module, to secure the assemblies to each other as well as to an ear in multiple locations. This approach may allow for the positioning of the audio/electronics module correctly for comfortable all-day wear for the user. The positioning and secure anchoring of the audio/electronics module can deliver optimized audio function with the sound source directing sound emissions to the ear canal in a safe and clearly audible fashion. The ornamentation attachment points can provide endless jewelry and embellishment attachments for personalized aesthetic expression.

In the present disclosure, an embodiment of an adjustable device 100 for securing to an ear, as illustrated in FIG. 1 can include three-piece construction. Further illustrated in FIG. 1 is a first attachment module 110, which in this embodiment can include a post 112 for the is structured and configured for insertion into an existing hole in a user's ear lobe, i.e., a pierced ear. The post 112 can be combined with a traditional earring back fastener (not shown).

Figure 7:
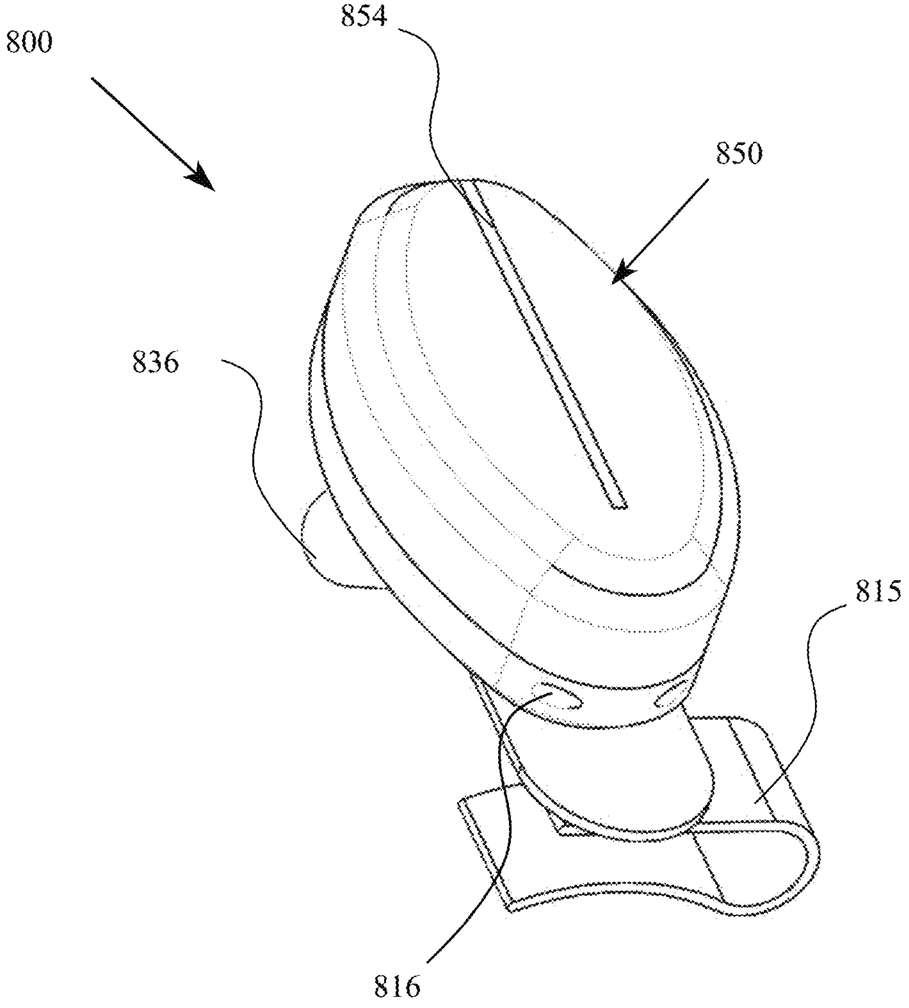
FIG. 7 is a top perspective view of an embodiment of an adjustable device for securing to an ear.
Figure 8A:
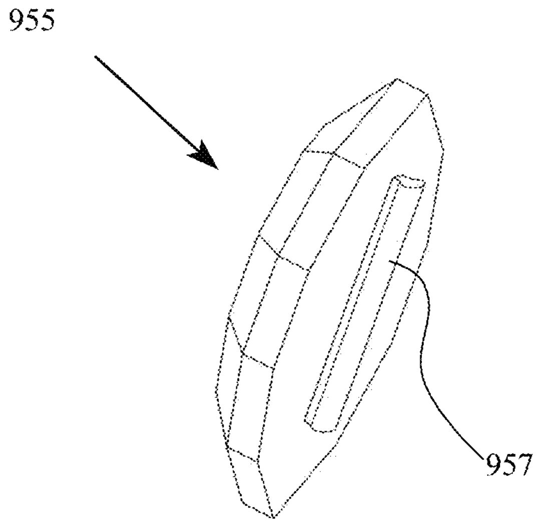
FIG. 8A is a view of an embodiment of a piece of jewelry that can attach to an adjustable device.
Figure 8B:
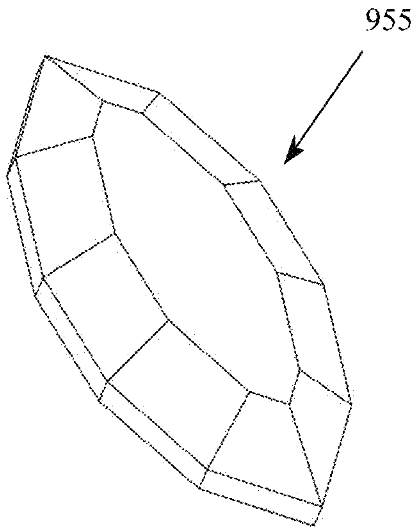
FIG. 8B is a view of an embodiment of a piece of jewelry that can attach to an adjustable device.
Figure 9A:
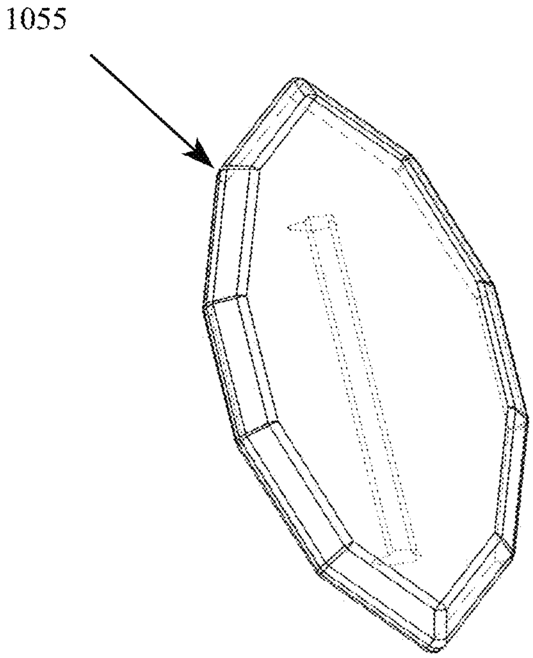
FIG. 9A is a view of an embodiment of a piece of jewelry that can attach to an adjustable device.
Figure 9B:
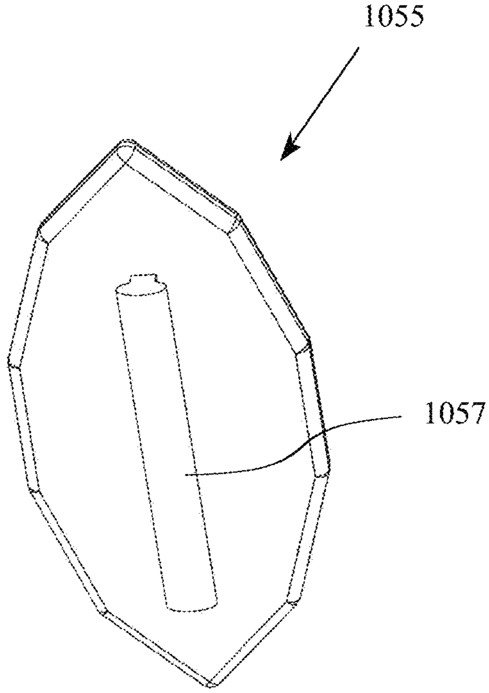
FIG. 9B is a view of an embodiment of a piece of jewelry that can attach to an adjustable device.

In other embodiments, for example, adjustable device 800, illustrated in FIG. 7 shows a clip 815 that is structured and configured to clip onto a user's earlobe; other clips known by persons with skill in the art may also be used. Also, on first attachment module 110 is a length adjuster 114 which can be a series of iteratively place grooves within first attachment module 110 that can interact with a tab 132 on the second attachment module 130.

Figure 2A:
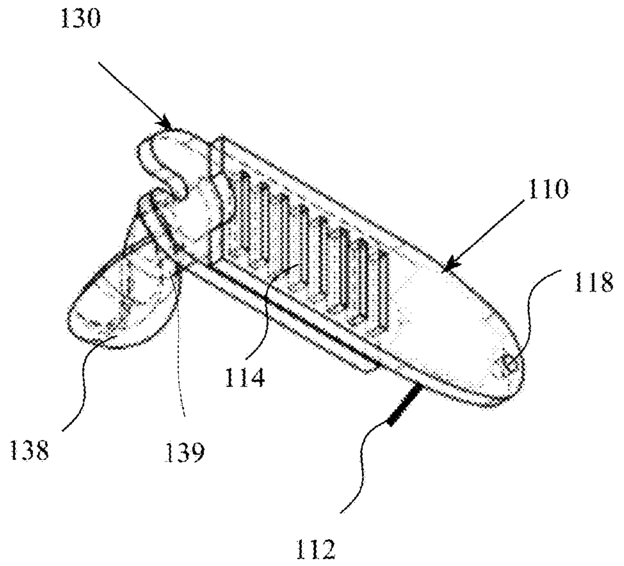
FIG. 2A is a perspective view of a portion of an embodiment of an adjustable device for securing to an ear.
Figure 2B:
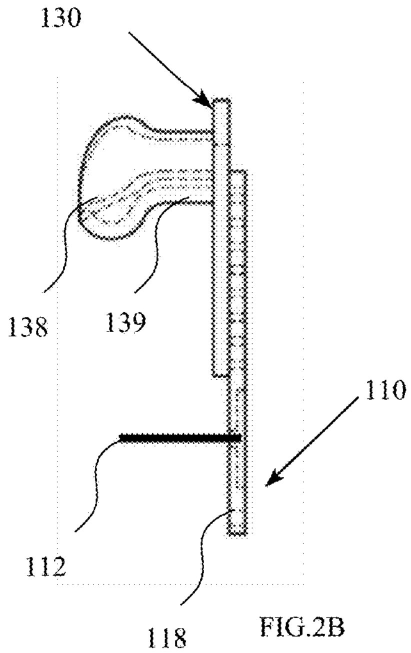
FIG. 2B is a side view of a portion of an embodiment of an adjustable device for securing to an ear.

In this particular embodiment, an ear lobe extension 116 has been provided to lower an second ornamentation attachment point 118; here, the attachment point is at a greater distance from the top of the adjustable device 100, in other embodiments, there may not be an ear lobe extension; for example, in FIGS. 2A and 2B there is no ear lobe extension.

Also in the embodiment of FIG. 1, the second attachment module 130 can include a set of rails 134, where the set of rails 134 are structured to fit within slots 156 located on an electronics module 150. Further included in this embodiment of the second attachment module 130 can be a stem 139 being disposed on one end of the second attachment module 130. Disposed on the opposite end of the stem 139 can be a head 138, which may include a hanger 136.

The electronics module 150 can include within its confines a plethora of electronic components. For example, speaker 152 can be in electronic communication with an assembly; where the internal assembly may include a group consisting of wireless antennas, user interface (UI)/user experience (UX) (UI/UX interfaces), microphones, circuitry, batteries, charging conduits, biosensors, haptic sensors, environmental sensors, transducers, computing processor chips, storage chips, and any combinations thereof.

The speaker 152 can have an optimized location to provide for a customized fit and position for the production of the sound outside of the ear canal. In some other embodiments, the speaker can be either inside the intertragical notch or just outside the intertragical notch, all without insertion into the ear canal.

An important feature of providing a first and second attachment module in the present innovation is to improve the weight distribution, security, and comfort via multiple attachment points. By attaching the adjustable device 100, and other embodiments with two attachment points, to the intertragical notch (or incisura) or over the antitragus bump area of the ear weight distribution and a user's sense of stability and security of the adjustable device 100 can be improved. A variation on the second attachment point can be a clip for non-pierced earlobes, or for user's who may prefer a clip over a post attachment. It may be possible to use an earring clip-on method to anchor the device to the bottom of the earlobe. Weights up to 12 grams when using a 2-3 point attachment method at the intertragical notch or antitragus cartilage can be tolerated better by users.

The adjustable device 100, and other embodiments with two attachment points, can provide a personalized fit to accommodate the unique physiology of each user's outer ear. This can be achieved through adjusting the distance between the hanger 138 and the post 112 by using the length adjuster 114 where a different groove of the series of iteratively place grooves interacts with the tabs 132 on the second attachment module 130. Using higher or lower grooves and tabs the distance between the hanger 138 and the post 112 can be increased or decreased to accommodate the variation in the distances of a user's intertragical notch or antitragus bump, and their ear lobe piercing (or ear lobe when a clip is utilized versus a post). Other consideration can be taken into account for the distance requirement of the hanger 138 and the post 112; for example, a custom fit that accommodates the variability of the distance from the ear opening to the user's piercing, the size and length of the earlobe, and the size and shape of the intertragical notch or antitragus bump.

A modular, personalization-enabled design is one of the driving factor for the present innovation. Configuring the design in a unique way that uses adjustable modular and attachment enabling industrial and mechanical design features to address the issues of weight distribution, speaker positioning and orientation, customized fit, more secure attachment, and embellishment customization. This unique approach can include modular parts for embodiments of devices that may be made up of two to three subassemblies which can together to create a whole, intact unit when assembled by the user. This can allow for adjustability of sizing for the user as well as optimal placement of the speaker proximate to the ear canal. The outside-of-ear canal, jewelry-oriented audio module can encase electronics, it may also presents as ear jewelry, and it may provide for all-day wear, including passive audio and other user-interfacing capabilities. This is all possible because of the unique attachment features can enable additional embellishments and jewelry ornamentations by users.

Figure 1A:
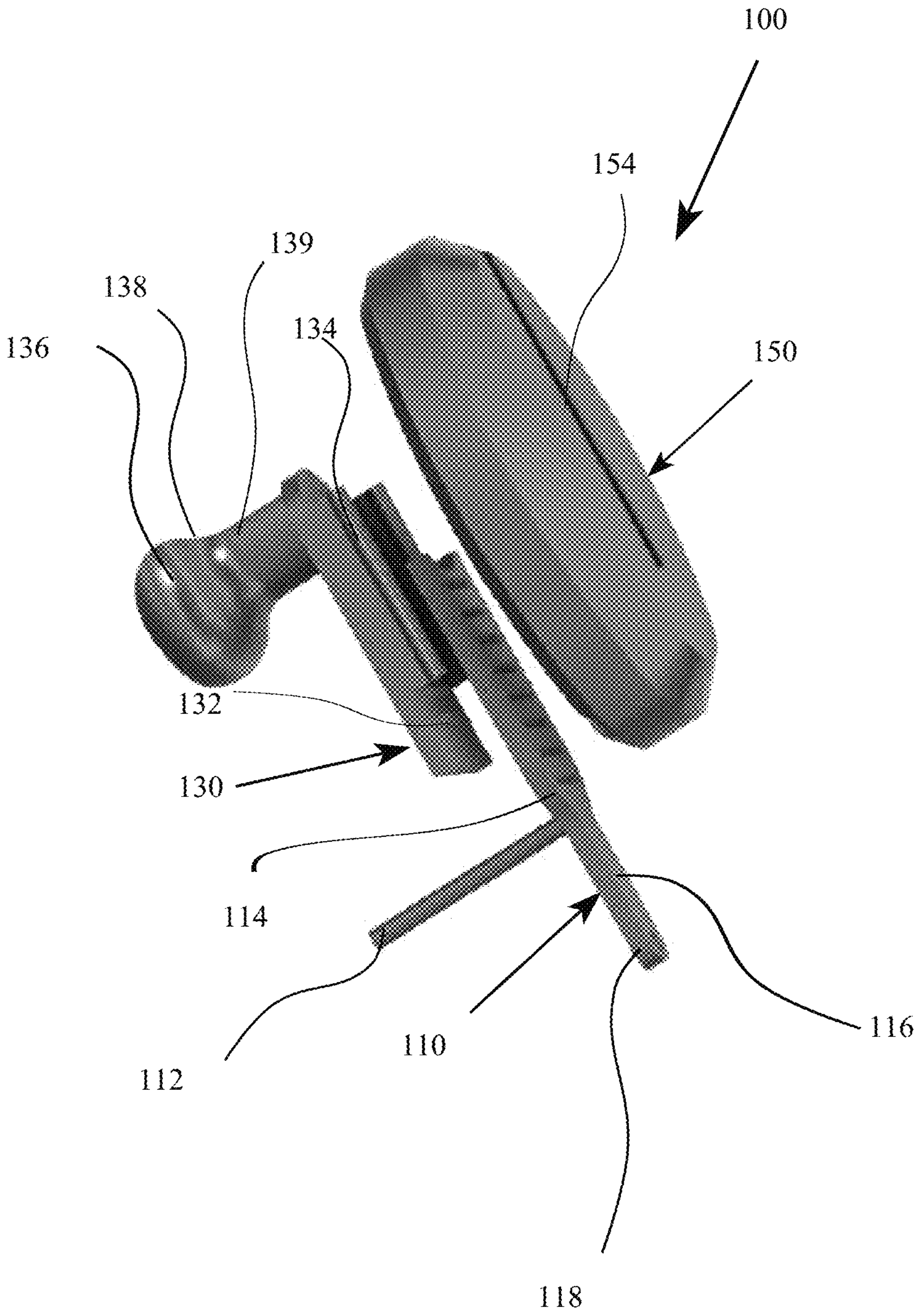
FIG. 1A is a side perspective view of an embodiment of an adjustable device for securing to an ear.

Illustrated in FIG. 1 is an adjustable device 100 that includes at least two attachment points for different ornamentations. For example, there is a first piece of jewelry 155 attached to the electronics module 150. Additionally, on the ear lobe extension 116 is the second ornamentation attachment point 118, where a second piece of jewelry can be attached (not shown). Further illustrated in FIG. 1A is the adjustable device 100 where a slot 154 is provided for the attachment of the first piece of jewelry 155. A few embodiments of the first piece of jewelry 155 are illustrated in FIGS. 8A-9B. These are mere examples of pieces of jewelry that can be attached to embodiments of an adjustable device, there is no limitation in the design and variety of jewelry. These particular pieces of jewelry can be attached to an electronics module and can be faceted in a fashion similar to a traditional jewelry stone cut, be smooth like a pearl, or be in any other surface presentation design that creates a unique look. Existing jewelry can also be used as is, or retrofitted with hanging or mounting mechanisms, and attached to the device in various locations.

Other embodiments of the first attachment module 110 and the second attachment module 130, are illustrated in FIGS. 2A and 2B. In this version there is no ear lobe extension; however, there is still a second ornamentation attachment point 118.

Figure 3A:
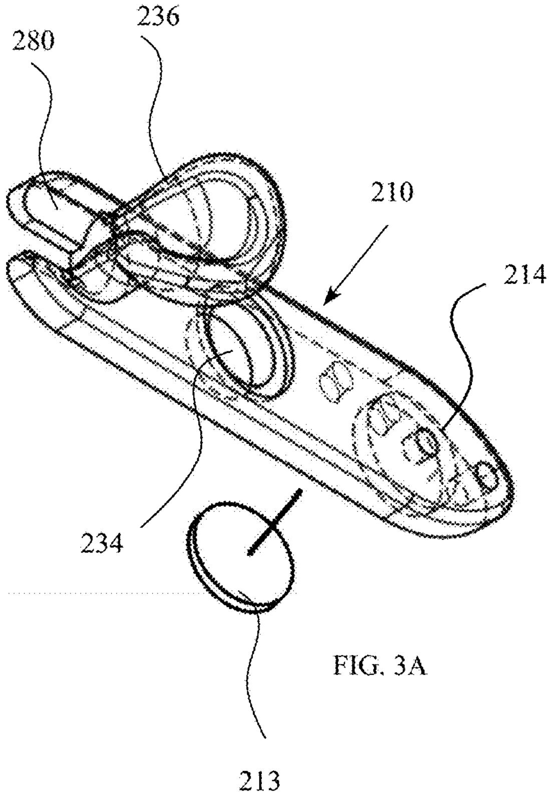
FIG. 3A is a perspective view of a portion of an embodiment of an adjustable device for securing to an ear.

In an additional embodiment of the adjustable device, there may only be a single attachment module, for example, in FIG. 3A, there is attachment module 210. In this particular embodiment, the distance between the hanger 236 and the post 213 can be adjusted with the use of the length adjuster 214, which is a series of iteratively spaced holes that can provide passage of the post 213, which, as described above, can be combined with a traditional earring back fastener (not shown). In this particular embodiment, the attachment module 210 can be secured to another module, such as an electronics module, via the auxiliary attachment point 234. In some variations of the embodiment of FIG. 3A, there can also be a hanger 236 that may move towards the end of the attachment module 210 via a spring adjustment mechanism allowing the hanger 236 to move on the glides 280 that are disposed in one end of the attachment module 210.

Figure 3B:
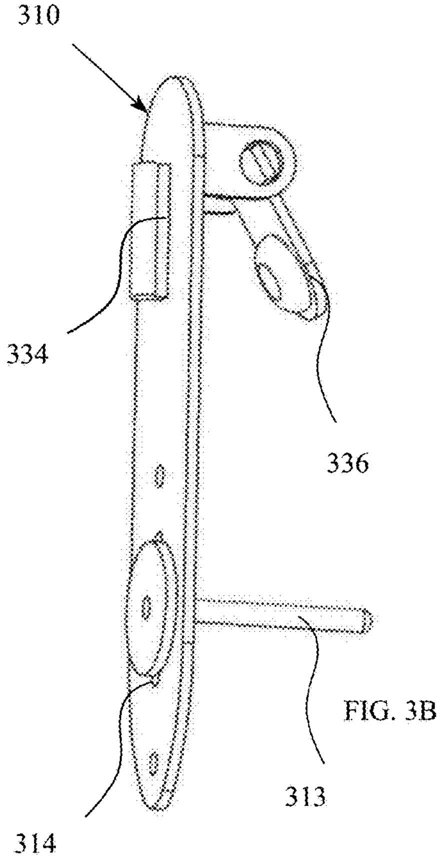
FIG. 3B is a side view of a portion of an embodiment of an adjustable device for securing to an ear.

Further variations of a single attachment module are illustrated in FIG. 3B. Where the attachment module 310 can be secured to another module, such as an electronics module, via the auxiliary attachment point 334. Additionally illustrated in FIG. 3B is a hanger 336 that swings on a pivot which may attach to a user's ear. Other variations of the attachment module, similar to the attachment modules 210 and 310 in FIGS. 3A and 3B, respectively, can be structured where the length adjustment is achieved by varying the distance between a permanently attached post and the hanger. In such embodiments, the device has a pre-set distance between the post and the hanger and is produced in a variety of sizes. Therefore, a user may choose the embodiment that best fits their particular ear.

Figure 4:
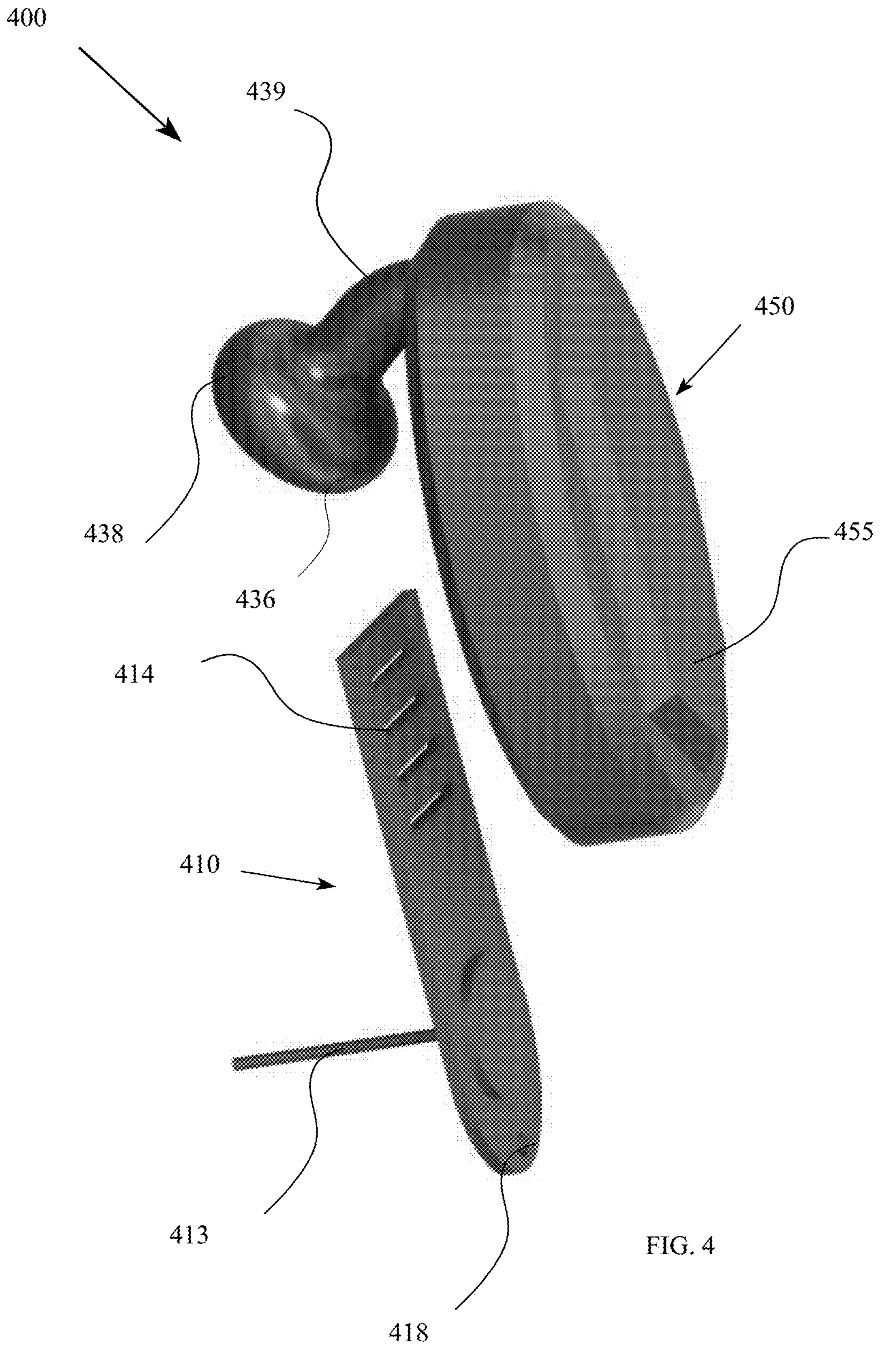
FIG. 4 is a perspective view of an embodiment of an adjustable device for securing to an ear.

Other embodiments may comprise two components to provide an adjustable device. For example, in FIG. 4, adjustable device 400 can comprise an attachment module 410 and electronics module 450. In this particular embodiment, the electronics module 450 can also include an attached first piece of jewelry 455; the attachment means is similar to the earlier described embodiments in FIGS. 1 and 1A. Just as with those embodiments, the electronics module 450 can include an assembly; where the internal assembly may include a group consisting of wireless antennas, UI/UX interfaces, microphones, circuitry, batteries, charging conduits, biosensors, haptic sensors, environmental sensors, transducers, computing processor chips, storage chips, and any combinations thereof. Here head 438 can contain a speaker that is in communication with the assembly. Other embodiments may have a head that includes other electronic components, for example, biosensors, at least one battery, or a hearing aid.

Figure 5:
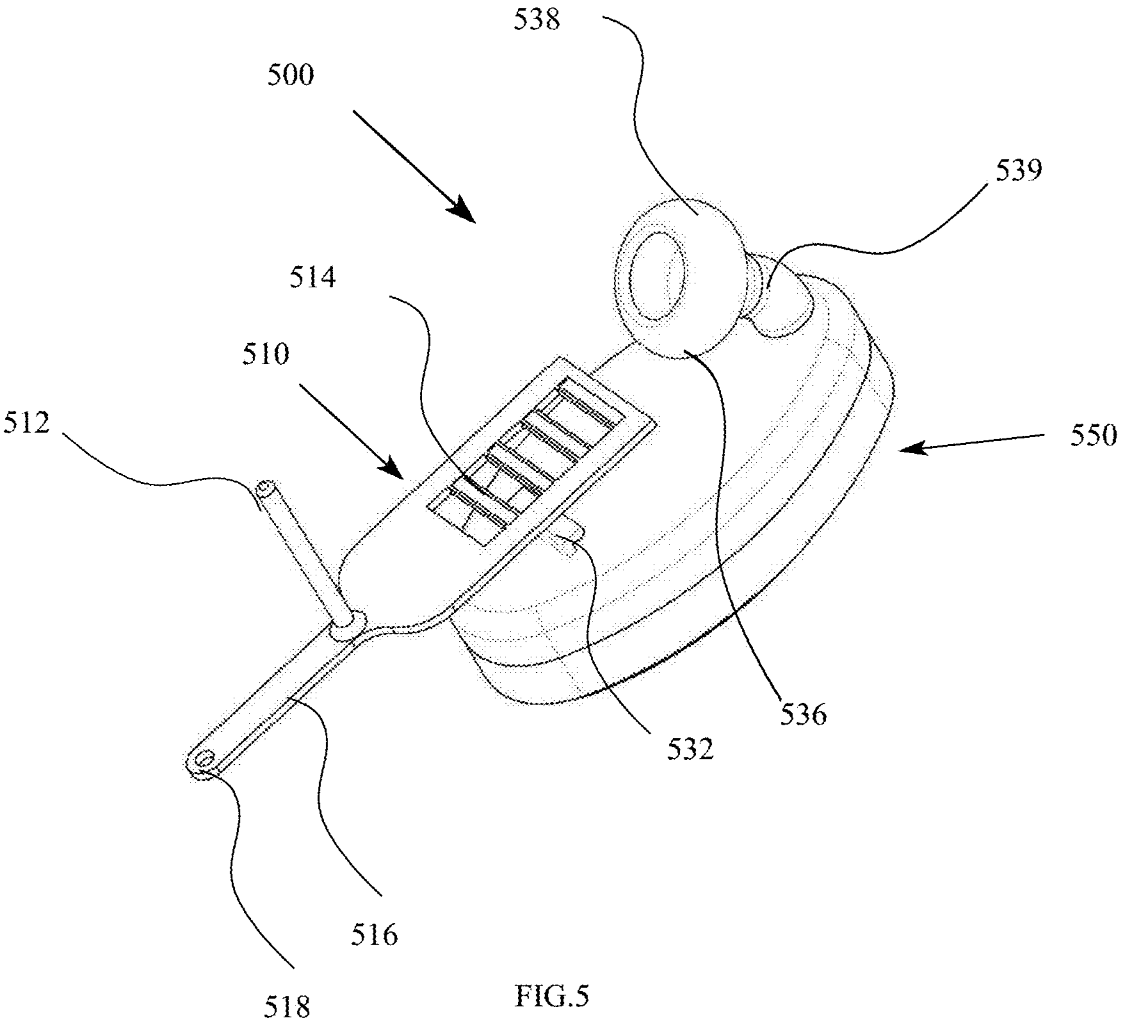
FIG. 5 is a perspective view of an embodiment of an adjustable device for securing to an ear.

Additionally, the attachment module 410 can include length adjuster 414, which can be a series of iteratively placed grooves that interact with an attachment point on the electronics module 450, similar to the one illustrated in FIG. 5, where length adjuster 514 interacts with a hook 532 to secure the two modules. In this embodiment, a post 413 can be provided to attach to a user's pierced ear. Other versions may include a clip instead of a post. For example, in FIG. 7, there is an adjustable device 800 with a clip 815. An additional pass-through 816 can be included in any embodiment that has a provided electronics module. Such a pass-through can add an additional attachment point for an ornamentation, for example, a hoop earring.

Also provided in attachment module 410 is a second ornamentation attachment point 418. In some versions, this device may also include an ear lobe extension similar to the one provide in the embodiment of FIG. 1; for example, in FIG. 5 there is an ear lobe extension 516 that includes a second ornamentation attachment point 518. Other devices may not include a second ornamentation attachment point.

Figure 6:
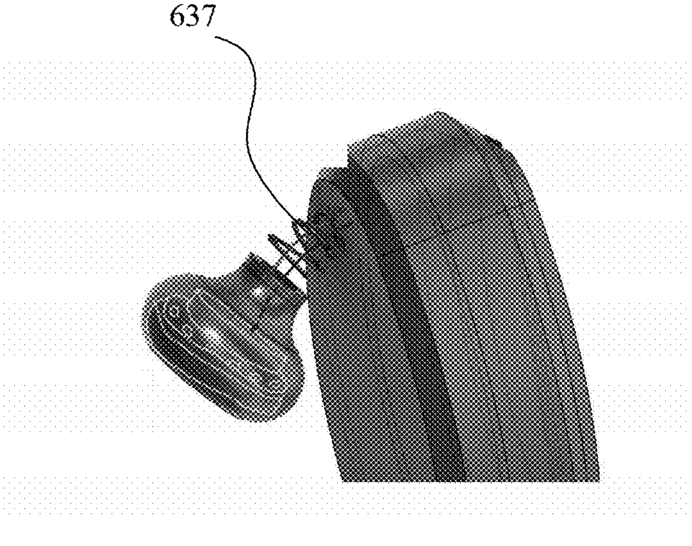
FIG. 6 is a partial broken view of an embodiment of an adjustable device for securing to an ear.

Any of the embodiments described above may include a stem that includes a spring. For example, FIG. 6 provides a partial cutaway where an internal spring 637 can be provided. This internal spring 637 can offer additional flexibility for attaching an adjustable device to a user's ear.

The electronics module described in the previous embodiments can be uniquely suited as both a functional jewelry piece on its own and has the added advantage of accommodating user personalization and aesthetic expression. It may contain high-performance wireless audio/transducer circuitry. It can have additional functions such as heart rate sensing, biosensing and/or emotion detection via additional transducer data, and/or hearing aid functionality.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is also intended to include features of a claim in any other independent claim, even if this claim is not directly made dependent to the independent claim.

What is claimed is:

1. An adjustable device for securing to an ear comprising:
- a first attachment module structured and configured to engage with an earlobe;
- a second attachment module;
- a hanger that protrudes from the second attachment module, wherein the hanger is structured and configured to mount an external portion of the ear above the earlobe;
- an electronics module comprising electronics;
- a length adjustment mechanism configured to adjust a distance between an end of the first attachment module and an end of the second attachment module, wherein the length adjustment mechanism comprises a spring-loaded rail; and
- a first ornamentation-attachment site disposed on the first attachment module.

2. The adjustable device of claim 1, wherein the first attachment module further comprises a post or a clip, wherein the post or the clip are structured and configured to attach to the earlobe.

3. The adjustable device of claim 1, wherein the first attachment module further comprises an extension, and wherein the extension comprises the first ornamentation-attachment site.

4. The adjustable device of claim 1, wherein the hanger further comprises a head and a stem disposed between the head and the second attachment module and wherein the hanger is structured and configured to attach to a portion of the ear from an antitragus to a tragus of the ear.

5. The adjustable device of claim 4, wherein the stem comprises a second clip.

6. The adjustable device of claim 1, wherein the electronics module comprises an assembly selected from a group consisting of wireless antenna, UI/UX interface, microphone, speaker, circuitry, battery, charging conduit, biosensor, haptic sensor, environmental sensors, transducer, computing processor chip, storage chip, and combinations thereof.

7. The adjustable device of claim 6, wherein the hanger does not comprise a speaker.

8. An adjustable device for securing to an ear comprising:
- a first attachment module structured and configured to engage with an earlobe via a post or a clip;
- a second attachment module;
- a hanger that protrudes from the second attachment module, wherein the hanger is structured and configured to mount an external portion of the ear above the earlobe;
- an electronics module comprising electronics;
- a distance between an end of the first attachment module and an end of the second attachment module;
- a first ornamentation-attachment site disposed on the electronics module, wherein the first ornamentation-attachment site is not positioned behind the earlobe and is configured to receive a replaceable ornamentation without the use of tools; and
- a second ornamentation-attachment site disposed on the first attachment module, wherein the second ornamentation-attachment site is not positioned behind the earlobe and is configured to receive a replaceable ornamentation without the use of tools.

9. The adjustable device of claim 8, wherein the electronics module comprises an assembly selected from a group consisting of wireless antenna, UI/UX interface, microphone, speaker, circuitry, battery, charging conduits, biosensors, haptic sensors, environmental sensors, transducers, computing processor chips, data storage chips, and combinations thereof.

10. The adjustable device of claim 8, wherein the hanger is comprised of a head and a stem disposed between the head and the second attachment module and wherein the hanger does not comprise a speaker.

11. The adjustable device of claim 8, further comprising a length adjustment mechanism configured to adjust the distance between the end of the first attachment module and the end of the second attachment module.

12. The adjustable device of claim 11, wherein the length adjustment mechanism comprises a series of iteratively placed grooves within the first attachment module configured to interact with a protruding attachment point on the second attachment module such that a user can adjust the distance between the end of the first attachment module and the end of the second attachment module by inserting the protruding attachment point into a selected one of the grooves.

13. The adjustable device of claim 8, wherein the stem comprises a second clip.

14. The adjustable device of claim 8, wherein the first ornamentation-attachment site is configured with a slot for receiving a corresponding protrusion on a replaceable ornamentation without the use of tools.

15. The adjustable device of claim 8, wherein the modules are positioned such that when the adjustable device is attached to the ear, the electronics module obscures the hanger from view.

16. The adjustable device of claim 8, wherein all the electronics associated with the adjustable device are contained within the electronics module.

17. The adjustable device of claim 8, wherein the electronics module comprises a speaker.

18. The adjustable device of claim 17, wherein the speaker is positioned outside of the ear when the adjustable device is attached to the ear.

19. The adjustable device of claim 8, wherein the hanger does not comprise a speaker.

20. The adjustable device of claim 8, wherein the modules are configured to be disconnected from one another without disassembling any particular module and the modules are configured to be reconnected together without assembling any particular module.

21. The adjustable device of claim 20, wherein the modules are configured to be disconnected from one another and reconnected together without the use of tools.

22. The adjustable device of claim 20, wherein the modules are configured to be disconnected from one another without disconnecting any electric wiring and the modules are configured to be reconnected together without connecting any electric wiring.

23. The adjustable device of claim 20, wherein the second attachment module includes a set of rails, wherein the set of rails are structured to fit within slots located on the electronics module.

24. A method of attaching an adjustable device to an ear comprising the steps of:
- providing the adjustable device comprising:
  - a first attachment module structured and configured to engage with an earlobe via a post or a first clip;
  - a second attachment module;
  - a hanger that protrudes from the second attachment module, wherein the hanger is structured and configured to mount an external portion of the ear above the earlobe, and further wherein the hanger comprises a head and a stem;
  - an electronics module comprising electronics;
  - at least one length adjustment mechanism, wherein the length adjustment mechanism is configured to adjust a distance between an end of the first attachment module and an end of the second attachment module;
  - a first ornamentation-attachment site disposed on the electronics module, wherein the first ornamentation-attachment site is configured to receive a replaceable ornamentation without the use of tools; and
  - a second ornamentation-attachment site disposed on the first attachment module, wherein the second ornamentation-attachment site is not positioned behind the earlobe and is configured to receive a replaceable ornamentation without the use of tools;
- determining a distance from a connection point on the earlobe to the external portion of the ear above the earlobe;
- using the at least one length adjustment mechanism to adjust the distance between the post or clip, and the head of the hanger to the determined distance from the connection point on the earlobe to the external portion of the ear above the earlobe;
- attaching the first attachment module to the earlobe; and
- hanging the hanger onto the external portion of the ear above the earlobe.

25. The method of claim 24, wherein the electronics module comprises an assembly selected from a group consisting of wireless antenna, UI/UX interface, microphone, speaker, circuitry, battery, charging conduits, biosensors, haptic sensors, environmental sensors, transducers, computing processor chips, storage chips, and combinations thereof.

26. The method of claim 24, wherein the head does not comprise an electronic component.

27. The method of claim 24, wherein the stem comprises a second clip.

28. An adjustable device for securing to an ear comprising:

a first attachment module structured and configured to engage with an earlobe;

a second attachment module;

a hanger that protrudes from the second attachment module, wherein the hanger is structured and configured to attach to a portion of the ear from an antitragus to a tragus of the ear;

an electronics module comprising electronics, wherein the electronics module comprises a speaker; and wherein the hanger does not comprise a speaker.

29. The adjustable device of claim 28, wherein the hanger comprises a stem and a head, wherein the stem is disposed between the head and the second attachment module.

30. The adjustable device of claim 28, further comprising at least one length adjustment mechanism, wherein the length adjustment mechanism is configured to adjust a distance between an end of the first attachment module and an end of the second attachment module.

31. The adjustable device of claim 28, wherein the modules are positioned such that when the adjustable device is attached to the ear, the electronics module obscures the hanger from view.

32. The adjustable device of claim 28, wherein all the electronics associated with the adjustable device are contained within the electronics module.

33. The adjustable device of claim 28, wherein the speaker is positioned outside of the ear when the adjustable device is attached to the ear.

34. The adjustable device of claim 28, wherein the modules are configured to be disconnected from one another without disassembling any particular module and the modules are configured to be reconnected together without assembling any particular module.

35. The adjustable device of claim 34, wherein the modules are configured to be disconnected from one another and reconnected together without the use of tools.

36. The adjustable device of claim 34, wherein the modules are configured to be disconnected from one another without disconnecting any electric wiring and the modules are configured to be reconnected together without connecting any electric wiring.

37. The adjustable device of claim 34, wherein the second attachment module includes a set of rails, wherein the set of rails are structured to fit within slots located on the electronics module.

38. The adjustable device of claim 28, further comprising a first ornamentation-attachment site disposed on the electronics module, wherein the first ornamentation-attachment site is configured to receive a replaceable ornamentation without the use of tools, and a second ornamentation-attachment site disposed on the first attachment module, wherein the second ornamentation-attachment site is configured to receive a replaceable ornamentation without the use of tools.

39. An adjustable device for securing to an ear comprising:

a first attachment module structured and configured to engage with an earlobe;

a second attachment module;

a hanger that protrudes from the second attachment module, wherein the hanger comprises a stem and a head, wherein the stem is disposed between the head and the second attachment module, and wherein the hanger is structured and configured to attach to a portion of the ear from an antitragus to a tragus of the ear; and an electronics module comprising electronics, wherein the electronics module comprises a speaker and all the electronics associated with the adjustable device are contained in the electronics module.

40. The adjustable device of claim 39, wherein the modules are positioned such that when the adjustable device is attached to the ear, the electronics module obscures the hanger from view.

41. The adjustable device of claim 39, the speaker is positioned outside of the ear when the adjustable device is attached to the ear.

42. The adjustable device of claim 39, wherein the modules are configured to be disconnected from one another without disassembling any particular module and the modules are configured to be reconnected together without assembling any particular module.

43. The adjustable device of claim 42, wherein the modules are configured to be disconnected from one another and reconnected together without the use of tools.

44. The adjustable device of claim 42, wherein each of the first or the second attachment module can be disconnected from one another without disconnecting any electronics or electric wiring and the modules can be reconnected together without connecting any electronics or electric wiring.

45. The adjustable device of claim 42, wherein the second attachment module includes a set of rails, wherein the set of rails are structured to fit within slots located on the electronics module.

46. The adjustable device of claim 39, further comprising a first ornamentation-attachment site disposed on the electronics module, wherein the first ornamentation-attachment site is configured to receive a replaceable ornamentation without the use of tools, and a second ornamentation-attachment site disposed on the first attachment module, wherein the second ornamentation-attachment site is configured to receive a replaceable ornamentation without the use of tools.

47. An adjustable device for securing to an ear comprising:

an attachment module structured and configured to engage with an earlobe via a post or a clip;

an electronics module, wherein the electronics module comprises electronics and a hanger, wherein the hanger is structured and configured to attach to a portion of the ear from an antitragus to a tragus of the ear; and wherein the adjustable device is modular such that the attachment module and the electronics module are configured to be disconnected from one another without disassembling either module and are configured to be reconnected together without assembling either module;

a first ornamentation-attachment site disposed on the electronics module, wherein the first ornamentation-attachment site is configured to receive a replaceable ornamentation without the use of tools, and a second ornamentation-attachment site disposed on the attachment module, wherein the second ornamentation-attachment site is configured to receive a replaceable ornamentation without the use of tools.

48. The adjustable device of claim 47, wherein the modules are configured to be disconnected from one another and reconnected together without the use of tools.

49. The adjustable device of claim 47, wherein the hanger comprises a speaker.

50. The adjustable device of claim 47, wherein all the electronics associated with the adjustable device are contained within the electronics module.

51. The adjustable device of claim 47, wherein the modules are positioned such that when the adjustable device is attached to the ear, the electronics module obscures the hanger from view.

52. The adjustable device of claim 47, wherein the modules are further configured to be disconnected from one another without disconnecting any electric wiring and the modules are configured to be reconnected together without connecting any electric wiring.

53. An adjustable device for securing to an ear comprising:

an attachment module structured and configured to engage with an earlobe via a post or a clip;

an electronics module, wherein the electronics module comprises electronics and a hanger, wherein the hanger is structured and configured to attach to a portion of the ear from an antitragus to a tragus of the ear;

wherein the adjustable device is modular such that the attachment module and the electronics module are configured to be disconnected from one another without disassembling either module and are configured to be reconnected together without assembling either module; and wherein the attachment module includes a length adjuster comprising a series of iteratively placed grooves and the electronics module includes a protruding attachment point that interacts with any of the grooves such that a user can adjust the distance between the hanger and an end of the attachment module by selecting a particular groove for the interaction.

54. The adjustable device of claim 53, further comprising a first ornamentation-attachment site disposed on the electronics module, wherein the first ornamentation-attachment site is configured to receive a replaceable ornamentation without the use of tools, and a second ornamentation-attachment site disposed on the attachment module, wherein the second ornamentation-attachment site is configured to receive a replaceable ornamentation without the use of tools.

55. An adjustable device of claim 47, for securing to an ear comprising:

an attachment module structured and configured to engage with an earlobe via a post or a clip;

an electronics module, wherein the electronics module comprises electronics and a hanger, wherein the hanger is structured and configured to attach to a portion of the ear from an antitragus to a tragus of the ear;

wherein the adjustable device is modular such that the attachment module and the electronics module are configured to be disconnected from one another without disassembling either module and are configured to be reconnected together without assembling either module; and wherein the attachment module is configured to engage with the earlobe via the post and wherein the attachment module includes a length adjuster comprising a series of iteratively placed holes each of which can provide passage of the post such that a user can adjust the distance between the hanger and the post by selecting a particular hole to receive the post.

* * * * *